UNITED STATES PATENT OFFICE.

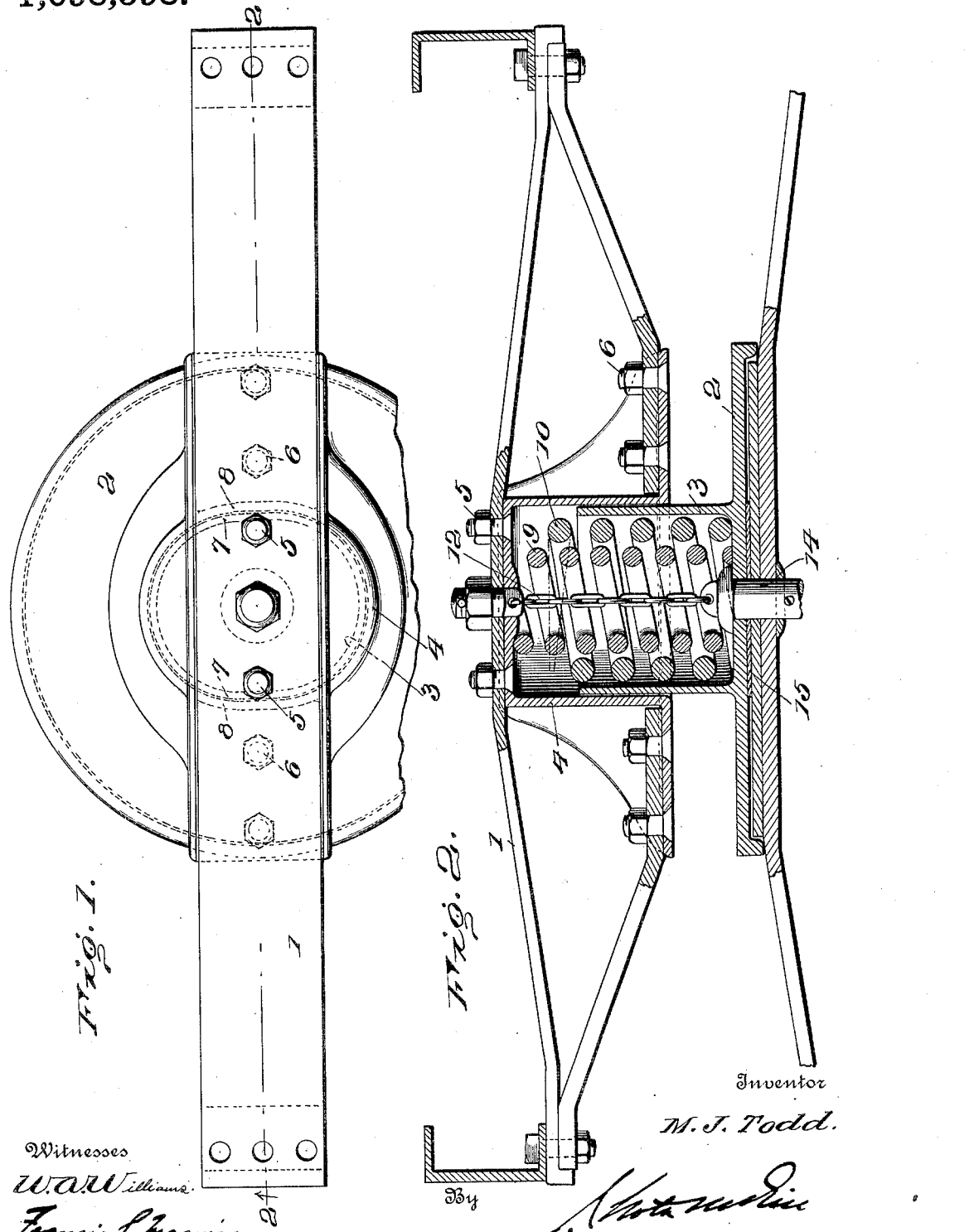

MARQUIS J. TODD, OF BUFFALO, NEW YORK, ASSIGNOR TO BUFFALO PITTS COMPANY, OF BUFFALO, NEW YORK, A CORPORATION OF NEW YORK.

VEHICLE-SPRING.

1,098,598.  Specification of Letters Patent.  Patented June 2, 1914.

Application filed April 25, 1913. Serial No. 763,586.

*To all whom it may concern:*

Be it known that I, MARQUIS J. TODD, of Buffalo, in the county of Erie and State of New York, have invented certain new and useful Improvements in Vehicle - Springs; and I do hereby declare the following to be a full, clear, and exact description of the invention, such as will enable others skilled in the art to which it appertains to make and use the same.

The object of this invention is to provide simple, durable, and highly efficient spring-mechanism for vehicles, especially that class employed for hauling heavy materials.

In the accompanying drawings, Figure 1 is a plan view. Fig. 2 is a sectional view on line 2—2, Fig. 1.

Referring to the drawings, 1 designates the bolster to which the chassis (not shown) is designed to be secured. This bolster is located above the fifth-wheel of the vehicle, and between it and the fifth-wheel I locate differential spring-mechanism. In the present instance I have shown the upper plate 2 of the fifth wheel provided with an upwardly extending barrel 3 which is open at its upper end and telescoped by a downwardly extending barrel 4, which is secured by bolts 5 and 6 to the upper and lower members of bolster 1. The barrels 3 and 4 are not truly cylindrical, being correspondingly flattened at their respective sides 7 and 8, as shown in Fig. 1, the object of flattening the barrels being to cause them to work in unison and to prevent rocking of the chassis. Within these barrels I locate a relatively light spring 9 and a relatively heavy spring 10, both of which rest upon the fifth-wheel member 2. When the weight of the vehicle is comparatively light, the lighter spring 9, being the longer, sustains it, but under a load the heavier spring 10 is also called into play.

Any suitable means may be employed for connecting the bolster to the fifth-wheel to prevent undue movement on recoil. In the present instance I have shown a chain 12 connected at its lower end to the head of the king bolt 14 of the fifth-wheel, said chain at its upper end being secured to the bolster. Between the two members of the fifth-wheel is located a central spacing plate 15 upon which the upper bolster and spring-mechanism may have a limited rocking motion.

By locating the springs directly over the fifth-wheel the best possible support is obtained; the springs are out of the way, and, being inclosed by the telescoping barrels, are protected from dirt and dust as well as the elements. It will be noted that according to my invention this arrangement does not in any sense interfere with the free and normal action of the fifth-wheel, which latter is free to turn on its pivot as occasion may require. Although the upper barrel 4 is free to move vertically, it is prevented from turning horizontally and from rocking independently of the lower barrel.

I claim as my invention:

1. In combination with a fifth-wheel and a member designed to be secured to the frame or body of a vehicle, two telescoping barrels, one carried by the fifth-wheel and located concentrically to the pivot thereof and the other carrying said member, and spring-mechanism within said barrels for carrying the weight of said member.

2. In combination with a fifth-wheel and a bolster, two telescoping barrels, one carried by the fifth-wheel and located concentrically to the pivot thereof and the other carrying said bolster, and spring-mechanism within said barrels for carrying the weight of said bolster.

3. In combination with a fifth-wheel and a bolster, two telescoping barrels, one carried by the fifth-wheel and located concentrically to the pivot thereof and the other carrying said bolster, and differential spring-mechanism within said barrels for carrying the weight of said bolster.

4. In combination with a fifth-wheel and a bolster, two telescoping barrels, one carried by the fifth-wheel and the other carrying said bolster, said barrels having a relative longitudinal movement, but incapable of relatively turning on their axes or rocking laterally, and spring-mechanism within said barrels for carrying the weight of said bolster.

5. In combination with a fifth-wheel and a bolster, two telescoping barrels, one carried by the fifth-wheel and the other carrying said bolster, said barrels being substantially of cylindrical formation, and having adjacent flattened portions for preventing either barrel from turning on its axis relatively to the other barrel, and also from rocking laterally, and spring-mechanism within said barrels for carrying the weight of said bolster.

6. In combination with a fifth-wheel and a bolster, a barrel extending upwardly from the fifth-wheel circumjacent to the pivot thereof, said barrel being open at its upper end, a second barrel depending from said bolster and open at its lower end, said barrels telescoping each other, coiled springs, of different tension, in said barrels and supporting said bolster, and means for limiting the movement of said bolster on the recoil of said springs.

7. In combination, a fifth-wheel composed of a fixed plate, an upper plate pivoted to the fixed plate, and a king bolt securing said plates together, a bolster, spring-mechanism interposed between said upper plate and said bolster, telescoping sleeves inclosing said spring-mechanism, and a connection between said king bolt and said bolster.

In testimony whereof, I have signed this specification in the presence of two subscribing witnesses.

MARQUIS J. TODD.

Witnesses:
FRANCIS S. MAGUIRE,
MILDRED P. IMIRIE.

Copies of this patent may be obtained for five cents each, by addressing the "Commissioner of Patents, Washington, D. C."